3,299,426
MOVING TARGET RADAR SYSTEM
Vincent R. Learned, Garden City, N.Y., and Charles A. Moreno, Los Angeles, Calif., assignors, by mesne assignments, to the United States of America as represented by the Secretary of the Army
Filed June 16, 1955, Ser. No. 515,836
13 Claims. (Cl. 343—7.7)

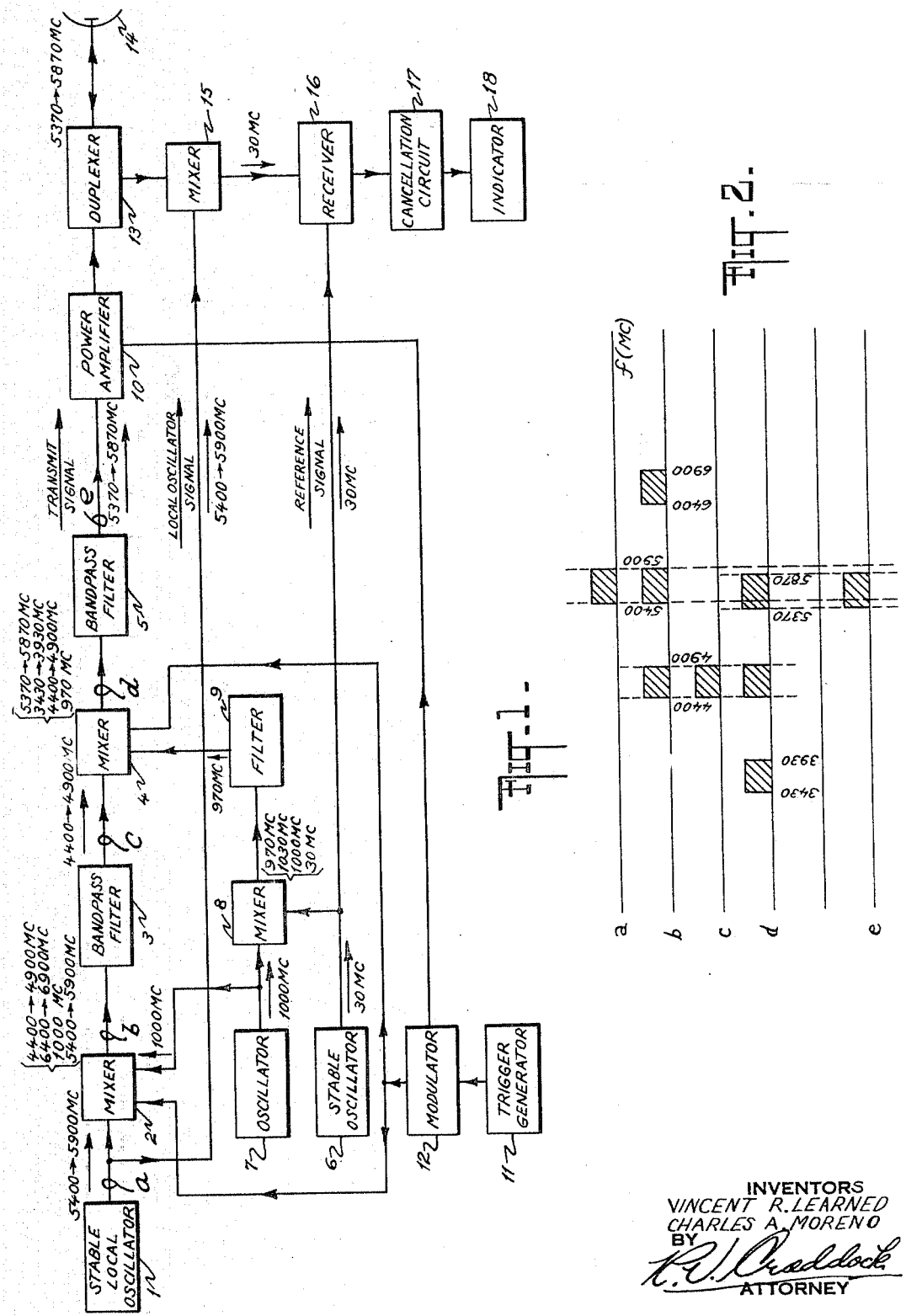

This invention relates to a moving target indication radar system having a tunable microwave transmitter for producing electrical signals whose frequency may be changed while maintaining phase coherency.

In many moving target indication radars, it is necessary that the signal transmitted by the system have phase coherency with the signal produced by a reference oscillator within the system. Thus, the phase of reflected echo signals returning from targets may be compared with the reference signal to indicate which targets are in motion and which are stationary. Prior art systems for producing such coherent signals would require separate adjustment of a number of different components when the operating frequency of the system was to be changed. A simple means to obtain such coherent signals is to heterodyne the signals from a stable local oscillator and from a reference oscillator operating at the intermediate frequency of the radar receiver. The sum or the difference sideband is selected by a filter and is amplified and transmitted. Returning echo signals are heterodyned with a signal from the local oscillator and an echo signal at the intermediate frequency is produced. By comparing the phase of this intermediate frequency echo signal with that of a signal from the intermediate frequency reference oscillator, information on the velocity of the target which returned the echo signal is obtained.

In the operation of such a radar, it is sometimes desirable to change the frequency of the signal transmitted in order to avoid conflict with a similar nearby radar or to avoid interference from a device such as an enemy jamming system. The prior art systems, because of the aforementioned required adjustments, do not lend themselves as well to this as does the system of the present invention.

It is, therefore, the principal object of this invention to provide an improved moving target indication radar of the type using phase coherent signals wherein the operating frequency may be varied over a wide range.

Another object of this invention is to provide an improved tunable microwave transmitter for producing phase coherent signals.

In accordance with the present invention, there is provided a stable local oscillator whose frequency is variable over the desired range of frequencies and whose output signal is heterodyned with a first signal whose frequency is greater than the desired tuning range of the radar system. A fixed tuned bandpass filter whose bandwidth is sufficient to accommodate the desired frequency range selects the sum or difference sideband signal. The output of this filter is heterodyned with a second signal whose frequency differs from the first signal by the intermediate frequency of the radar receiver. Another fixed tuned bandpass filter of similar bandwidth selects the sideband signal whose frequency differs from that of the local oscillator by the intermediate frequency of the radar receiver. This signal is then amplified and transmitted. Since the filters need not be tuned, no tracking problem arises and single-knob tuning is facilitated.

Other and further objects and advantages of the present invention will be apparent from the following description of a preferred embodiment of the invention.

FIGURE 1 is a block diagram of one embodiment of this invention; and

FIGURE 2 is a graph illustrating the operation of this invention.

The transmitter portion of the moving target indication radar shown is that portion which generates the three signals indicated as "transmit signal," the signal which is transmitted by the radar, "local oscillator signal," the signal which is heterodyned with the returning echo signals, and "reference signal," the reference intermediate frequency signal used for phase comparison with the intermediate frequency echo signals. A local oscillator 1, which may be any frequency stable generator of microwave signals, is capable of being tuned over the desired frequency range. An example of such an oscillator is a reflex klystron. Local oscillator 1 is shown as tunable over the range of 5400 to 5900 megacycles, which is a satisfactory operating range chosen by way of example only.

A mixer 2 is connected to and receives a portion of the signal generated by local oscillator 1, as shown in FIG. 1. Connections between these two components and between other components of the system may be made by any suitable transmission means, such as wave guide or coaxial line. A beating signal whose frequency is greater than the frequency represented by the desired tuning range of the radar is also applied to the mixer 2, where it is heterodyned with the signal from local oscillator 1. By introducing a beating signal of such frequency, the sidebands will be sufficiently separated from the local oscillator frequencies that a particular sideband may be selected with a fixed tuned bandpass filter. This is shown in FIG. 2 where line $a$ indicates the frequency range of the signal generated by local oscillator 1 and line $b$ indicates the frequency ranges of the signals produced by mixer 2. Since the tuning range is 500 megacycles, the beating signal introduced into mixer 2 is chosen by way of example to be 1000 megacycles. The output signals from mixer 2, which are of greatest magnitude, are the two input signals and their sum and difference sidebands. The sum frequencies will vary from 6400 to 6900 megacycles, depending on the frequency to which local oscillator 1 is tuned, and the difference frequencies will vary from 4400 to 4900 megacycles. While mixer 2 may be any device which heterodynes the two input signals, to conform with the principles of this invention it is further desired that mixer 2 function without the necessity of being tuned when the frequency of oscillator 1 is changed. Mixers which will so operate are, for example, those of the traveling-wave type and are shown in U.S. Patent 2,657,-305 to Knol, and in an article entitled "A Wide-Band Power Mixer Tube," by H. R. Johnson in the Transactions of the I.R.E. Professional Group on Electron Devices, December 1953.

Returning to FIG. 1, a bandpass filter 3 may be designed to pass either the upper sideband signal range or the lower sideband signal range of the output of filter 2. In the instant case, filter 3 has been designed to pass the lower sideband signal range. The range of the output signal from filter 3 is shown on line $c$ of FIG. 2.

Referring again to FIG. 1, a mixer 4, similar to mixer 2, is connected to and receives the output signal of bandpass filter 3. A beating signal whose frequency differs from that of the beating signal applied to mixer 2 by an amount equal to the intermediate frequency of the radar receiver 16 is also applied to the mixer 4, where it is heterodyned with the output signal of filter 3. Thus, if the intermediate frequency of the radar receiver is 30 megacycles, the frequency of the beating signal applied to mixer 4 should be 30 megacycles higher or lower than that of the beating signal injected into mixer 2. In the instant case, a beating signal of 970 megacycles is injected into mixer 4. However, it is again necessary that this beating signal be greater in frequency than the frequency represented by the tuning range of the radar. The range of signals produced by mixer 4 is indicated in line *d* of FIG. 2.

Either the upper or lower sideband signal generated in mixer 4 differs in frequency from that of the signal of local oscillator 1 by the intermediate frequency of the radar receiver and is the signal to be selected for transmission. A bandpass filter 5 is designed to pass the desired sideband, in this example the range of frequencies of 5370 to 5870 megacycles. The output of bandpass filter 5, shown on line *e* of FIG. 2, is the frequency which the radar system transmits.

Thus, in this invention, by beating in succession the local oscillator signal with two signals that differ from each other by the intermediate frequency of the radar receiver, and which are each greater in frequency than the desired range of frequencies over which the local oscillator is to be tuned, a phase coherent output signal is obtained which varies over the same range of frequencies and whose frequency differs from the frequency of the local oscillator by the intermediate frequency. It is seen that this invention would operate in a similar manner if mixer 2 were to select the sum sideband frequency and mixer 4 the difference sideband frequency. The system would also operate according to the teachings of this invention if the beating signal injected into mixer 4 were higher by the intermediate frequency than the beat signal injected into mixer 2.

FIG. 1 shows a preferred arrangement for producing the reference intermediate frequency signal and the two beating frequency signals. A continuously operating stable oscillator 6 generates the reference signal. An example of such an oscillator is a crystal-controlled vacuum tube oscillator. A portion of the signal of oscillator 6 is fed directly to the radar receiver for reference purposes. A second portion is used to insure that the respective beating signals injected into mixer 2 and mixer 4 differ by the intermediate frequency.

An oscillator 7 has a portion of its output applied to mixer 2 as the beating signal. A mixer 8 is connected to and receives another portion of the signal generated by oscillator 7. Another portion of the output signal of oscillator 6 is also applied to mixer 8, where it is heterodyned with the signal from oscillator 7. A filter 9, which is highly selective, separates one of the sideband output signals of mixer 8 for application as the beating signal to mixer 4. In the example shown, the difference sideband frequency of 970 megacycles is selected.

Thus, from the combination of one stable oscillator 6, an oscillator 7, a mixer 8, and a filter 9, there is generated a reference signal for use in the radar receiver and a pair of beating signals for use in mixers 2 and 4. It is only necessary that oscillator 6 be stabilized. Oscillator 7 may be inexpensively constructed and permitted to drift within the allowable frequency limits of filter 9 because its frequency and phase components are cancelled due to selection of the difference sideband of mixer 2 and the sum sideband of mixer 4.

Thus, the output of the transmitter portion is the signal to be transmitted, whose frequency differs by the value of the intermediate frequency signal from that of the local oscillator signal; a local oscillator signal; and a reference intermediate frequency signal. All three signals are coherent in phase and therefore suitable for use in moving target indication systems.

A power amplifier 10 amplifies the output signal of bandpass filter 5, said signal being designated the transmit signal. This power amplifier may be an untuned traveling wave amplifier or a tunable klystron amplifier. If it is a tunable klystron amplifier, its tuning control may be ganged with the tuning control of stable oscillator 1 so that single-knob control is available.

If the radar is to operate in a pulsed mode of transmission, the output signal of the system must be keyed. A trigger generator 11 producing pulses at the proper recurrence rate and of proper width is provided. The output of trigger generator 11 is applied to modulator 12, where keying or trigger pulses are distributed to proper portions of the system. Thus, one output of modulator 12 is directed to power amplifier 10, where the output may be keyed by a pulsed accelerating voltage. Another output of modulator 12 is shown directed to mixers 2 and 4. By operating these mixer tubes only during the period when energy is to be transmitted, traveling-wave tubes of lower power rating may be utilized, and leakage of internal signals to the receiver during reception is minimized.

The output of power amplifier 10 is directed through a duplexer 13 to a radiating means 14, where it is radiated into space. The function of duplexer 13 is to protect the radar receiver mixer 15 during transmission and to insure that all the reflected power received by radiating means 14 during reception will be directed into the radar receiver.

Echo signals from targets which are received by radiating means 14 are directed through duplexer 13 to a mixer 15. A portion of the signal from local oscillator 1 is also applied to mixer 15 where it is heterodyned with the echo signals. Mixer 15 may be any conventional type of microwave crystal mixer. The resulting difference frequency between the two signals applied to mixer 15, which is the intermediate frequency, is the selected output. The intermediate frequency output of mixer 15 and the intermediate frequency reference signal from oscillator 6 are applied to receiver 16 where they are mixed, amplified and detected. The resulting output signal from receiver 16 will be one which depends on the relative phase of the two input intermediate frequency signals. The difference in phase between these two signals is dependent on the round-trip distance between radar and target. This phase difference will remain constant if the target is stationary and will vary if the target is moving. In this manner either the relative velocity of the target may be determined, or fixed targets and moving targets may be distinguished. A cancellation circuit 17 may be used to reject echoes from fixed targets.

The moving target output signals of cancellation circuit 17 are displayed on an indicator 18. Indicator 18 may be of any type; such as, type A, type B, or PPI presentation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A variable frequency moving target indicator radar system comprising a high frequency local oscillator, an intermediate frequency oscillator, a third oscillator, a receiver mixer connected to said local oscillator for converting received echo signals to corresponding signals of intermediate frequency, means connected to said mixer and said intermediate frequency oscillator to discriminate between those intermediate frequency signals that are respectively coherent and not coherent with the output of said intermediate frequency oscillator, said local oscillator being tunable to any frequency within a band, the frequency difference between the extremes of which is substantially greater than said intermediate frequency, a frequency converter chain connected to said local oscillator and comprising a mixer, a bandpass filter, a mixer and a bandpass filter connected respectively in cascade, said third oscillator producing a beating signal for one of said chain mixers having a fixed frequency higher than the difference between the extremes of the tuning band of said local oscillator, and means including a fourth mixer connected to said intermediate frequency and third oscillators for producing a beating signal for the other of said chain mixers that differs from the frequency of the beating signal for said one chain mixer by said intermediate frequency, the sidebands produced in the outputs of each of said chain mixers thereby being separated by substantially more than said tuning range, said bandpass filters being designed each to pass only one of the sidebands in the output of its respective mixer whereby the frequency of the output component of said chain differs constantly from that of said local oscillator by said intermediate frequency, and the operating frequency of the radar system can be changed by adjusting only the frequency of said local oscillator.

2. A variable frequency moving target indicator radar system comprising a high frequency local oscillator, an intermediate frequency oscillator, a third oscillator, said local oscillator being tunable to any frequency within a band, the frequency difference between the extremes of which is substantially greater than said intermediate frequency, a frequency converter chain connected to said local oscillator and comprising a mixer, a bandpass filter, a mixer and a bandpass filter connected respectively in cascade, said third oscillator producing a beating signal for one of said chain mixers having a fixed frequency substantially higher than the difference between the extremes of the tuning band of said local oscillator, means including a fourth mixer connected to said intermediate frequency and third oscillators for producing a beating signal for the other of said chain mixers that differs from the frequency of the beating signal for said one chain mixer by said intermediate frequency, the sidebands produced in the outputs of each of said chain mixers thereby being separated by substantially more than said tuning range, said bandpass filters being designed each to pass only one of the sidebands in the output of its respective mixer whereby the frequency of the output component of said chain differs constantly from that of said local oscillator by said intermediate frequency and the operating frequency of the radar system can be changed by adjusting only the frequency of said local oscillator and means connected to said local oscillator and said intermediate frequency oscillator and adapted to discriminate received echo signals from moving targets from received echo signals from stationary targets.

3. A variable frequency moving target indicator radar transmitter comprising a high frequency local oscillator, an intermediate frequency oscillator, a third oscillator, said local oscillator being tunable to any frequency within a band, the frequency difference between the extremes of which is substantially greater than said intermediate frequency, a frequency converter chain connected to said local oscillator and comprising a mixer, a bandpass filter, a mixer and a bandpass filter connected respectively in cascade, said third oscillator producing a beating signal for one of said chain mixers having a fixed frequency substantially higher than the difference between the extremes of the tuning band of said local oscillator, and means including a fourth mixer connected to said intermediate frequency and third oscillators for producing a beating signal for the other of said chain mixers that differs from the frequency of the beating signal for said one chain mixer by said intermediate frequency, the sidebands produced in the outputs of each of said chain mixers thereby being separated by substantially more than said tuning range, said bandpass filters being designed each to pass only one of the sidebands in the output of its respective mixer whereby the frequency of the output component of said chain differs constantly from that of said local oscillator by said intermediate frequency and the operating frequency of the radar system can be changed by adjusting only the frequency of said local oscillator.

4. A variable frequency moving target indicator radar transmitter comprising a high frequency local oscillator, said local oscillator being tunable to any frequency within a band, a frequency converter chain connected to said local oscillator and comprising a mixer, a bandpass filter, a mixer and a bandpass filter connected respectively in cascade, means for producing a beating signal for one of said chain mixers having a fixed frequency substantially higher than the difference between the extremes of the tuning band of said local oscillator, and means for producing a beating signal for the other of said chain mixers that differs from the frequency of the beating signal for said one chain mixer by a predetermined frequency which is substantially less than the difference between the extremes of said tuning band, the sidebands produced in the outputs of each of said chain mixers thereby being separated by substantially more than said tuning range, said bandpass filters being designed each to pass only one of the sidebands in the output of its respective mixer whereby the frequency of the output component of said chain differs constantly from that of said local oscillator by said predetermined frequency and the operating frequency of the radar system can be changed by adjusting only the frequency of said local oscillator.

5. A transmitter for producing electrical signals coherent in phase comprising means for generating a first signal whose frequency is tunable over a predetermined range of frequencies, means for generating a second signal, means for generating a third signal, said second and third signals differing in frequency and each being greater in frequency than the width of said range of frequencies, a first mixer for heterodyning together said first and second signals to produce their sum and difference sideband signals, a first filter for passing one of said sideband signals produced by said first mixer, a second mixer for heterodyning together said third signal and the signal passed by said first filter to produce their sideband signals, one of said sideband signals produced by said second mixer differing in frequency from the frequency of said first signal by an amount equal to the frequency difference between said second and third signals, and a second filter for passing said one sideband signal produced by said second mixer, whereby the signal passed by said second filter and said first signal are always coherent in phase as the first signal is tuned.

6. A transmitter for producing electrical signals coherent in phase comprising means for generating a first signal whose frequency is tunable over a predetermined range of frequencies, means for generating a second signal whose frequency is greater than the width of said range of frequencies, means for generating a third signal whose frequency is less than the width of said range of frequencies, said second and third signals differing in frequency by an amount greater than the width of said range of frequencies, a first mixer for heterodyning together a portion of said second and third signals to produce their sum and difference sideband signals, a first filter for passing one of said sideband signals produced by said first mixer, said first filter output being a fourth signal, a second mixer for heterodyning together said first signal and one of said second and fourth signals to produce their sum and difference sideband signals, a second filter for passing one of said sideband signals produced by said second mixer, a third mixer for heterodyning together the signal passed by said second filter and the other of said second and fourth signals to produce their sideband signals, one of said sideband signals produced by said third mixer differing in frequency from the frequency of said first signal by the frequency of said third signal, and a third filter for passing said one sideband signal produced by said third mixer, whereby the signal passed by said third filter and said third signal are coherent in phase.

7. A transmitter as in claim 6 further including means for radiating the signal passed by said third filter, whereby said signal may be directed toward reflecting targets and reflected echo signals from said targets received, and a fourth mixer for heterodyning together said echo signals and said first signal, whereby a difference frequency is produced which is equal in frequency to and may be compared in phase with said third signal.

8. A transmitter as in claim 6 further including means for radiating the signal passed by said third filter, whereby said signal may be directed toward reflecting targets and reflected echo signals from said targets received, a fourth mixer for heterodyning together said echo signals and said first signal, whereby a difference frequency signal is produced which is equal in frequency to said third signal, and means for adding said difference frequency signal generated by said fourth mixer and said third signal.

9. A transmitter as in claim 6, wherein there is further provided means for keying the signal passed by said third filter.

10. A moving target indication radar comprising means for generating a first signal whose frequency is tunable over a predetermined range of frequencies, means for generating a second signal, means for generating a third signal, said second and third signals differing in frequency and each being greater in frequency than the width of said range of frequencies, first mixing means for heterodyning together a portion of said first signal and said second signal to produce their sum and difference sideband signals, first filter means for passing one of said sideband signals produced by said first mixing means, second mixing means for heterodyning together said third signal and the signal passed by said first filter means to produce their sideband signals, one of said sideband signals produced by said second mixing means differing in frequency from the frequency of said first signal by an amount equal to the frequency difference between said second and third signals, second filter means for passing said one sideband signal produced by said second mixing means, means for amplifying the signal passed by said second filter means, means for radiating said amplified signal, whereby said signal may be directed toward reflecting targets and the reflected echo signals from said targets received by said radiating means, and third mixing means for heterodyning together the echo signals received by said radiating means and a portion of said first signal.

11. A moving target indication radar as in claim 10, wherein there is further provided means for keying said amplifying means whereby said amplified signal may be radiated only during discrete intervals of time.

12. Apparatus as in claim 5 wherein each of said first and second filters is adapted to pass a range of frequencies having a bandwidth equal to the bandwidth of said predetermined range of frequencies.

13. Apparatus as in claim 1 further including means coupled to said chain and adapted to radiate said output component, whereby said signal may be directed toward reflecting targets and reflected echo signals from said targets received, and means adapted to receive said echo signals and to apply said signals to said receiver mixer.

References Cited by the Examiner

UNITED STATES PATENTS

| 2,435,569 | 2/1948 | Barrow | 250—13 X |
| 2,519,369 | 8/1950 | Hansen et al. | 343—5 |
| 2,586,028 | 2/1952 | Grayson et al. | 343—7.7 |
| 2,589,838 | 3/1952 | McConnell | 343—7.7 |
| 2,659,076 | 11/1953 | Emslie | 343—7.7 |

FOREIGN PATENTS 625,034   6/1949   Great Britain.

OTHER REFERENCES

"The TD-2 Microwave Radio Relay System" by A. A. Roetken et al., Bell System Technical Journal, vol. 30, October 1951, pages 1041–1077.

RODNEY D. BENNETT, *Acting Primary Examiner.*

NORMAN H. EVANS, *Examiner.*

M. A. MORRISON, *Assistant Examiner.*